US006361756B1

(12) United States Patent
Gao et al.

(10) Patent No.: US 6,361,756 B1
(45) Date of Patent: Mar. 26, 2002

(54) DOPED LITHIUM MANGANESE OXIDE COMPOUNDS AND METHODS OF PREPARING SAME

(75) Inventors: Yuan Gao, Ocean, NJ (US); Marina Yakovleva, Gastonia, NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/442,302

(22) Filed: Nov. 19, 1999

Related U.S. Application Data

(60) Provisional application No. 60/109,415, filed on Nov. 20, 1998.

(51) Int. Cl.[7] .................. C01G 45/12; C01G 49/00; C01G 37/14; C01G 23/00; H01M 4/50
(52) U.S. Cl. .................. 423/599; 423/594; 423/596; 423/598; 429/224
(58) Field of Search .................. 423/599, 594, 423/596, 598; 429/224, 223

(56) References Cited

U.S. PATENT DOCUMENTS

| | | |
|---|---|---|
| 4,497,726 A | 2/1985 | Brule et al. |
| 4,507,371 A | 3/1985 | Thackeray et al. |
| 4,546,058 A | 10/1985 | Charkey et al. |
| 4,668,595 A | 5/1987 | Yoshino et al. |
| 4,749,634 A | 6/1988 | Sammells |
| 4,770,960 A | 9/1988 | Nagaura et al. |
| 4,956,247 A | 9/1990 | Miyazaki et al. |
| 5,028,500 A | 7/1991 | Fong et al. |
| 5,084,366 A | 1/1992 | Toyoguchi |
| 5,147,738 A | 9/1992 | Toyoguchi |
| 5,160,712 A | 11/1992 | Thackeray et al. |
| 5,169,736 A | 12/1992 | Bittihn et al. |
| 5,180,574 A | 1/1993 | Von Sacken |
| 5,196,278 A | 3/1993 | Idota |
| 5,244,757 A | 9/1993 | Takami et al. |
| 5,264,201 A | 11/1993 | Dahn et al. |
| 5,286,582 A | 2/1994 | Tahara et al. |
| 5,316,877 A | 5/1994 | Thackeray et al. |
| 5,370,949 A | 12/1994 | Davidson et al. |
| 5,478,671 A | 12/1995 | Idota |
| 5,478,672 A | 12/1995 | Mitate |
| 5,478,673 A | 12/1995 | Funatsu |
| 5,478,674 A | 12/1995 | Miyasaka |
| 5,487,960 A | 1/1996 | Tanaka |
| 5,494,762 A | 2/1996 | Isoyama et al. |
| 5,503,930 A | 4/1996 | Maruyama et al. |
| 5,506,077 A | 4/1996 | Koksbang |
| 5,518,842 A | 5/1996 | Fey et al. |
| 5,591,543 A | 1/1997 | Peled et al. |
| 5,595,842 A | 1/1997 | Nakane et al. |
| 5,605,773 A | 2/1997 | Ellgen |
| 5,609,975 A | 3/1997 | Hasegawa et al. |
| 5,620,812 A | 4/1997 | Tahara et al. |
| 5,626,635 A | 5/1997 | Yamaura et al. |
| 5,631,105 A | 5/1997 | Hasegawa et al. |
| 5,672,329 A | 9/1997 | Okada et al. |
| 5,672,446 A | 9/1997 | Barker et al. |
| 5,674,645 A | 10/1997 | Amatucci et al. |
| 5,677,087 A | 10/1997 | Amine et al. |
| 5,679,481 A | 10/1997 | Takanishi et al. |
| 5,683,835 A | 11/1997 | Bruce |
| 5,686,203 A | 11/1997 | Idota et al. |
| 5,700,598 A | 12/1997 | Denis et al. |
| 5,718,877 A | 2/1998 | Manev et al. |
| 5,718,989 A | 2/1998 | Aoki et al. |
| 5,742,070 A | 4/1998 | Hayashi et al. |
| 5,750,288 A | 5/1998 | Xie et al. |
| 5,759,717 A | 6/1998 | Amine et al. |
| 5,766,800 A | 6/1998 | Manev et al. |
| 5,783,332 A | 7/1998 | Amine et al. |
| 5,783,333 A | 7/1998 | Mayer |
| 5,789,115 A | 8/1998 | Manev et al. |
| 5,792,442 A | 8/1998 | Manev et al. |
| 5,795,558 A | 8/1998 | Aoki et al. |
| 5,858,324 A | 1/1999 | Dahn et al. |
| 5,879,654 A | 3/1999 | van Ghemen et al. |
| 5,900,385 A | 5/1999 | Dahn et al. |
| 5,958,624 A | 9/1999 | Frech et al. |
| 5,961,949 A | 10/1999 | Manev et al. |
| 5,965,293 A | 10/1999 | Idota et al. |
| 6,017,654 A | 1/2000 | Kumta et al. |
| 6,040,089 A | 3/2000 | Manev et al. |
| 6,048,643 A | 4/2000 | van Ghemen et al. |
| 6,071,645 A | 6/2000 | Biensan et al. |
| 6,080,510 A | 6/2000 | Hemmer et al. |
| 6,114,064 A | 9/2000 | Manev et al. |
| 6,267,943 B1 * | 7/2001 | Manev et al. |

FOREIGN PATENT DOCUMENTS

| | | |
|---|---|---|
| DE | 44 35 117 C1 | 5/1996 |
| EP | 0 712 172 A2 | 5/1996 |
| EP | 0 712 172 A3 | 7/1996 |
| EP | 0 744 381 A1 | 11/1996 |
| EP | 0 840 386 A1 | 5/1998 |

(List continued on next page.)

OTHER PUBLICATIONS

Gao et al., Patent Application Serial No. 08/954,372, filed Oct. 20, 1997, entitled *Metal Oxide Containing Multiple Dopants and Method of Preparing Same*; pp. 1–29.

(List continued on next page.)

Primary Examiner—Steven Bos
(74) Attorney, Agent, or Firm—Alston & Bird LLP

(57) ABSTRACT

The present invention includes lithium manganese oxide compounds of the formula:

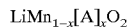

$LiMn_{1-x}[A]_xO_2$ wherein $0<x<0.5$, [A] is a combination of two or more dopants, and the average oxidation state N of the dopant combination [A] is $+2.8 \leq N \leq +3.2$. The present invention also includes lithium and lithium-ion secondary batteries that use these lithium manganese oxide compounds as the positive electrode material. Moreover, the present invention includes methods of preparing these lithium manganese oxide compounds.

21 Claims, No Drawings

FOREIGN PATENT DOCUMENTS

| | | |
|---|---|---|
| EP | 0 885 845 A1 | 12/1998 |
| JP | 63121258 A | 5/1988 |
| JP | 63/210028 | 8/1988 |
| JP | 63210028 | 8/1988 |
| JP | 02139861 A | 5/1990 |
| JP | 3108261 A | 5/1991 |
| JP | 04-162356 | 6/1992 |
| JP | 6124707 A | 5/1994 |
| JP | 7114915 A | 5/1995 |
| JP | 7192721 A | 7/1995 |
| JP | 8264179 A | 1/1996 |
| JP | 8078004 A | 3/1996 |
| JP | 8138649 A | 5/1996 |
| JP | 8138669 A | 5/1996 |
| JP | 8250120 A | 9/1996 |
| JP | 8287914 A | 11/1996 |
| JP | 10241691 A2 | 11/1996 |
| JP | 9007638 A2 | 1/1997 |
| JP | 9147859 | 6/1997 |
| JP | 10001316 A | 1/1998 |
| JP | 10027611 A | 1/1998 |
| JP | 10214624 A | 8/1998 |
| JP | 4345759 A2 | 12/1998 |
| JP | 11016573 A | 1/1999 |
| WO | WO 96/34423 | 10/1996 |

OTHER PUBLICATIONS

Gao et al., Patent Application Serial No. 09/078,849, filed May 14, 1998, entitled *Lithium Metal Oxide Containing Multiple Dopants and Method of Preparing Same;* pp. 1–29.

Mishima et al., *Development of Cathode and Anode Active Materials for Lithium Ion Battery,* Yuasa–Jiho No. 79, Oct. 1995, pp. 13–20.

D. Gryffroy and R.E. Vandenberghe, Cation distribution, cluster structure and ionic ordering of the spinel series lithium nickel manganese titanium oxide (LiNiO.5Mn1.5-xTixO4) and lithium nickel magnesium manganese oxide (LiNi0.5-yMgyMn1.5O4); J.Phys. Chem. Solids (1992), 53(6), 777–84 (Abstract only), no month.

D. Gryffroy ; R.E. Vandenberghe; and D. Poelman; Optical absorption of nickel (Ni2 + (d8)) and manganese (Mn4+ (d3)) in some spinel oxides; Solid State Commun. (1992), 82(7), 497–500 (Abstract only), no month.

A. Van Der Ven, M.K. Aydinol, G. Ceder, G. Kresse and J. Hafner; First–principles investigation of phase stability in $Li_xCoO_2$; 1998 The American Physical Society, vol. 58, No. 6, pp. 2975–2987, no month.

C. Pouillerie, L. Croguennec, Ph. Biensan, P. Willmann and C. Delmas; Synthesis and Characterization of New $LiNi_{1-y}Mg_yO_2$ Positive Electrode Materials for Lithium–Ion Batteries; Journal of The Electrochemical Society, 147 (6) pp. 2061–2069 (2000), no month.

T. Ohzuku, A. Ueda and M. Kouguchi; Synthesis and Characterization of $LiAl_{1/4}Ni_{3/4}O_2$ (R3m) for Lithium–Ion (Shuttlecock Batteries); J. Electrochem. Soc., vol. 142, No. 12, pp. 4033–4039, Dec., 1995.

Krutzsch et al.; Uber das system $Li_{1-x..y}Cu_xMnRuO_4$; Journal of the Less–Common Metals, 124, pp. 155–164 (1986), no month.

Krutzsch et al.; Spinelle IM System $Li_{1-2}Cu_2RhRu_{1-x}Mn_xO_4$; Journal of the Less–Common Metals, 132, pp. 37–42 (1987), no month.

Reimers et al.; Structure and electrochemistry of $Li_xF_eyNi_{1-y}O_2$; Solid State Ionics 61, pp. 335–344 (1993), no month.

Biensan et al.; Optimized $LiNi_{1-m}M_mO_2$ Materials With Improved Safety and Fading; SAFT, ECS Joint International Meeting, Oct. 17–22, 1999.

Igawa, A. et al., Secondary Lithium Batteries With Lithium and Magnesium Containing Oxide Cathodes, JP 10 241691 A, Chemical Abstracts, Abstracts No. 205207, vol. 129, No. 16, 1998 (XP–002134145), no month.

Hitachi LTD., Patent Abstracts of Japan, JP 10 241691 A, vol. 1998, No. 14, Dec. 31, 1998.

International Search Report for PCT/US99/27511, mailed Apr. 7, 2000, E. Siebel.

Ceder et al., The Stability of Orthorhombic and Monoclinic–Layered $LiMnO_2$, *Electrochemical and Solid–State Letters,* (1999), pp. 550–552, 2 (11), no month.

Dahn et al., Structure and Electrochemistry of $Li_2Cr_xMn_{2-x}O_4$ for $1.0 \leq x \geq 1.5$, *J. Electrochem. Soc.,* Mar., 1998, pp. 851–859, vol. 145, No. 3.

Jang et al., Stabilization of $LiMnO_2$ in the $\alpha$–$NaFeO_2$ Structure Type by $LiAlO_2$ Addition, *Electrochemical and Solid–State Letters,* (1998), pp. 13–16, 1 (1), no month.

Wickham et al., Crystallographic and Magnetic Properties of Several Spinels Containing Trivalent JA–1044 Manganese, *J. Phys. Chem. Solids,* Pergamon Press 1958, pp. 351–360, vol. 7, no month.

De Kock et al., The effect of multivalent cation dopants on lithium magnanese spinel cathodes, *Journal of Power Sources,* vol. 70, Issue 2, Feb., 1998, pp. 247–252.

Gummow et al., Improved capacity retention in rechargeable 4 V lithium/lithium manganese oxide (spinel) cells, *Solid State Ionics,* (1994), no month.

Tarascon et al., The Spinel Phase of $LiMn_2O_4$ as a Cathode in Secondary Lithium Cells, *J. Electrochem. Soc.,* Oct., 1991, vol. 138, No. 10, pp. 2859–2864.

Padhi et al., Ambient and High–Pressure Structures of $LiMnVO_4$ and Its $Mn^{3+}/Mn^{2+}$ Redox Energy, *Journal of Solid State Chemistry,* (1997), 128, Article No. SC967217, pp. 267–272, no month.

Amine et al., Preparation and Electrochemical Investigation of $LiMn_{1.5}Me_{0.5}O_4$ (Me:Ni,Fe) Cathode Materials For Secondary Lithium Batteries, Fundamental Technology Laboratory, Corporate R&D Center, Japan Storage Battery Co., Ltd. 11–B–34, no date.

Amine et al., Preparation and electrochemical investigation of $LiMn_{2-x}Me_xO_4$ (Me: Ni, Fe, and x=0.5, 1) cathode materials for secondary lithium batteries, *Journal of Power Sources,* 68, (1997), pp. 604–608, no month.

Pistoia et al., Doped Li–Mn Spinels: Physical/Chemical Characteristics and Electrochemical Performance in Li Batteries, *American Chemical Society,* 9, (1997), pp. 1443–1450, no month.

Suzuki et al., Valence Analysis of Transition Metal Ions in Spinel LiMnMO4 (M = Ti, Cr, Mn, Co) by Electron Energy Loss Spectroscopy, *J. Phys. Chem. Solids,* (1996), vol. 57, No. 12, pp. 1851–1856, no month.

Rossen et al., Structure and electrochemistry of $Li_xMn_yNi_{1-y}O_2$, *Solid State Ionics,* (1992), pp. 311–318, no month.

Banov et al., Lithium Manganese Cobalt Spinel Cathode for 4V Lithium Batteries, 8$^{th}$ International Meeting on Lithium Batteries, Jun. 16–21, 1996, Nagoya Japan, pp. 452–453.

Moshtev et al., Chemically Desodiated Thiochromites as Cathode Materials in Secondary Lithium Cells, *Journal of Power Sources,* 26, (1989), pp. 285–292, no month.

Hernan et al., Use of Li–M–Mn–O [M = Co, Cr, Ti] spinels prepared by a sol–gel method as cathodes in high–voltage lithium batteries, *Solid State Ionics,* 118, (1999) pp. 179–185, no month.

Armstrong et al., Synthesis of layered LiMnO2 as an electrode for rechargeable lithium batteries, *Nature,* Jun. 6, 1996), vol. 381, pp. 499–500.

* cited by examiner

DOPED LITHIUM MANGANESE OXIDE COMPOUNDS AND METHODS OF PREPARING SAME

CROSS-REFERENCE TO RELATED APPLICATIONS

This application is related to commonly owned copending provisional application Ser. No. 60/109,415 filed Nov. 20, 1998, and claims the benefit of the earlier filing date of this application under 35 U.S.C. § 119(e).

FIELD OF THE INVENTION

The present invention relates to lithium manganese oxides for use in rechargeable lithium and lithium-ion secondary batteries and to methods of making lithium manganese oxides.

BACKGROUND OF THE INVENTION

Rechargeable lithium and lithium-ion secondary batteries are presently used in portable electronics applications and are potential long-term candidates for powering emission-free vehicles. At present, $LiCoO_2$, $LiNiO_2$ and $LiMn_2O_4$ are considered to be the most attractive cathode (positive electrode) materials for use in lithium and lithium-ion batteries. $LiNiO_2$ and $LiCoO_2$ both have high theoretical capacities of about 275 mAh/g. However, the full capacity of these compounds cannot be achieved in practice and only about 140–150 mAh/g can be utilized. Further removal of lithium from $LiNiO_2$ and $LiCoO_2$ further decreases the cycleability of these compounds and causes exothermic decomposition of the oxide. This decomposition releases oxygen at elevated temperatures thus producing safety hazards. $LiNiO_2$, in particular, raises safety concerns because it exhibits a sharper exothermic reaction at a lower temperature than $LiCoO_2$. In addition to these problems, both cobalt and nickel are relatively expensive thus increasing the cost of using these compounds.

$LiMn_2O_4$ is often considered a desirable alternative to $LiNiO_2$ and $LiCoO_2$ because it is cheaper and because it is believed to be safer on overcharge. In particular, $LiMn_2O_4$ generally has no removable lithium to plate the anode when it is overcharged. Moreover, the end of charge member, $MnO_2$, is believed to be more stable than $CoO_2$ and $NiO_2$, the end of charge members of $LiCoO_2$ and $LiNiO_2$, respectively. Nevertheless, the theoretical capacity of $LiMn_2O_4$ is only 148 mAh/g and typically no more than about 115–120 mAh/g can be obtained with good cycleability.

$LiMnO_2$ has traditionally been of great interest for use as a positive electrode material because it has a large theoretical capacity (280 mAh/g). Furthermore, $LiMnO_2$ has a stable end of charge member ($MnO_2$) and is a relatively inexpensive compound to produce. Typically, $LiMnO_2$ is present in an orthorhombic crystalline form. When cycled in a rechargeable lithium or lithium-ion battery, this orthorhombic form converts into a spinel form having a 4V plateau (cubic phase) and a 3V plateau (tetragonal distorted spinel phase). Unfortunately, however, this spinel form loses capacity rapidly when it is cycled through both plateaus. Therefore, this form has not found much utility in lithium and lithium-ion batteries.

In order to provide a $LiMnO_2$ compound that is suitable for lithium and lithium-ion batteries, there have been attempts to produce $LiMnO_2$ with a layered crystalline structure analogous to the layered structure of $LiCoO_2$ and $LiNiO_2$. For example, a $LiMnO_2$ phase has been produced through ion exchange that has the same layered cation distribution as $LiCoO_2$. See A. Armstrong and P. G. Bruce, *Nature* 381, 499 (1996). The crystalline structure of this layered phase is monoclinic because of the Jahn Teller effect. The stability of the material is poor, however, and the capacity diminishes within only tens of cycles.

Recently, Jang et al. described a layered compound $LiMn_{1-x}Al_xO_2$ having a monoclinic crystalline structure and prepared in a solid state reaction at temperatures exceeding 900° C. See Y. Jang et al., *Electrochemical and Solid-State Letters* 1, 13 (1998). The aluminum-doped material produced by Yang et al. was shown to have better cycleability than layered $LiMnO_2$ and was able to sustain more than 20 cycles. But the reversible capacity of this material is only about 110 mAh/g, far below the theoretical capacity. Moreover, after only a few cycles, this material converts to the spinel form having separate plateaus at 3 V and 4 V and thus loses capacity quickly through cycling.

SUMMARY OF THE INVENTION

The present invention includes lithium manganese oxide compounds of the formula:

$$LiMn_{1-x}[A]_xO_2$$

wherein $0<x<0.5$, [A] is a combination of two or more dopants, and the average oxidation state N of the dopant combination [A] is $+2.8 \leq N \leq +3.2$. For these compounds, N is preferably about +3.0 and $0<x\leq 0.4$. Preferably, at least one of the dopants is either titanium or zirconium.

In one embodiment of the invention, $x=a$ and $[A]_x$ is 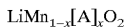. According to this embodiment, $A^1$ is Ti, Zr, or a combination thereof; and $A^2$ is Mg, Ca, Sr, Zn, Ba, or a combination thereof. More preferably, $A^1$ is Ti, $A^2$ is Mg and $0<a\leq 0.4$.

In a second embodiment of the invention, the lithium manganese oxide compound of the invention has the formula $LiMn_{1-b}Ni_cA^0_dA^1_eA^2_fO_2$, wherein $A^0$ is Cr, Co, or a combination thereof; $A^1$ is Ti, Zr, or a combination thereof; $A^2$ is Mg, Ca, Sr, Zn, Ba, or a combination thereof; $b=c+d+e+f$; $0.1\leq b\leq 0.5$; $0.1\leq c\leq 0.3$; $0d\leq 0.4$; $0\leq e\leq 0.2$; $0\leq f\leq 0.2$, and the average oxidation state N of the dopant combination [Ni, $A^0$, $A^1$, $A^2$] is $+2.8\leq N\leq +3.2$. Preferably, in this embodiment, $A^0$ is Cr, $A^1$ is Ti, $A^2$ is Mg, and N is about +3.0.

The present invention also includes lithium and lithium-ion secondary batteries that include the above lithium manganese compounds as the positive electrode material. In addition, the present invention includes dilithiated forms of the lithium manganese oxide compounds of the invention having the formula $Li_{1-z}Mn_{1-x}[A]_xO_2$, wherein $0\leq z\leq 1$.

The present invention further includes methods of preparing lithium manganese compounds having the formula $LiMn_{1-x}[A]_xO_2$ wherein $0<x\leq 0.5$, [A] is a combination of two or more dopants, and the average oxidation state N of the dopant combination [A] is $+2.8\leq N\leq +3.2$. The methods of the invention forms these compounds by first mixing together source compounds containing lithium, manganese and [A] in amounts corresponding to the formula $LiMn_{1-x}[A]_xO_2$ wherein $0<x\leq 0.5$, [A] is a combination of two or more dopants, and the average oxidation state N of the dopant combination [A] is $+2.8\leq N\leq +3.2$. The mixture of source compounds is then fired (heated) at a temperature of greater than 700° C., and preferably between 800° C. and 1000° C. to produce the $LiMn_{1-x}[A]_xO_2$ compound.

These and other features and advantages of the present invention will become more readily apparent to those skilled in the art upon consideration of the following detailed description, which describes both the preferred and alternative embodiments of the present invention.

DETAILED DESCRIPTION OF THE PREFERRED EMBODIMENTS

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

The present invention relates to using multiple dopants to improve the stability of $LiMnO_2$ in cycling. The compounds of the invention have a substantially single phase, layered structure and may include a certain amount of monoclinic distortion. The structure of these compounds can be determined by powder x-ray diffraction or any other suitable method.

The compounds of the present invention can be represented according to the formula:

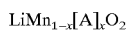

$$LiMn_{1-x}[A]_xO_2$$

wherein $0<x<0.5$, $[A]$ is a combination of two or more dopants, and the average oxidation state N of the dopant combination $[A]$ is $+2.8 \leq N \leq +3.2$. Preferably, the average oxidation state is about +3.0. As would be readily understood by those skilled in the art, the average oxidation state N is based on the molar amounts of the dopants used and the valences of the dopants used. For example, if the dopants are 40% $Ti^{4+}$ and 60% $Mg^{2+}$, on a molar basis, the average oxidation state N of he dopants $[A]$ would be $(0.4)(+4)+(0.6)(+2)=+2.8$.

It is important in accordance with the invention that the manganese content in the lithium manganese oxide compound $LiMn_{1-x}[A]_xO_2$ is greater than 0.5; i.e., that $0<x<0.5$. Preferably, the manganese content is 0.6 or greater, i.e. $0<x\leq 0.4$. For the compounds of the invention, a manganese content of greater than 0.5 and preferably 0.6 or greater produces a compound having good safety characteristics. Furthermore, because manganese is relatively inexpensive compared to the dopants used with the invention, it allows the lithium manganese oxide to produced at a relatively lower cost.

As defined above, the dopants $[A]$ are used to replace manganese and are not used to take the place of the lithium ions in the lithium manganese oxide compounds of the invention. Therefore, the reversible capacity is maximized in the compounds of the invention. Exemplary dopants for use in the invention can be either metals or non-metals metals that are cationic in nature. These dopants can generally be elements other than manganese having a Pauling's electronegativity of not greater than 2.05 or Mo. Preferably, these dopants are two or more of Li, Ni, Cr, Co, Al, Ti, Zr, Mg, Ca, Sr, Zn and Ba.

In accordance with the invention, at least one of the dopants used in the lithium manganese oxide compounds is preferably either titanium or zirconium. It has been discovered that the presence of the titanium or zirconium as dopants provides greater structural stability to the lithium manganese oxides of the invention. In addition to either titanium, zirconium, or a combination thereof, the lithium manganese oxide compounds typically include a monovalent dopant (e.g. Li) and/or a divalent dopant (e.g. Mg, Ca, Sr, Zn or Ba) to provide the desired average oxidation state N for the dopants $[A]$.

In one embodiment of the invention, the lithium manganese oxide compound can be described according to the formula $LiMn_{1-a}A^1_{a/2}A^2_{a/2}O_2$, i.e., wherein $x=a$ and $[A]_x$ is replaced with $A^1_{a/2}A^2_{a/2}$. In this embodiment, $A^1$ is preferably Ti, Zr or a combination thereof, and is more preferably Ti. In addition, $A^2$ is preferably Mg, Ca, Sr, Zn, Ba, or a combination thereof, and is more preferably Mg. It is also preferred that $0<a\leq 0.4$.

In a second embodiment of the invention, the lithium manganese oxide compound can have the formula $LiMn_{1-b}Ni_cA^0_dA^1_eA^2_fO_2$, wherein $A^0$ is Cr, Co, or a combination thereof; $A^1$ is Ti, Zr, or a combination thereof; $A^2$ is Mg, Ca, Sr, Zn, Ba, or a combination thereof; $b=c+d+e+f$; $0.1 \leq b<0.5$; $0.1 \leq c \leq 0.3$; $0 \leq d \leq 0.4$; $0 \leq e \leq 0.2$; and $0 \leq f \leq 0.2$. Preferably, $0.1 \leq b \leq 0.4$; $0.1 \leq c \leq 0.3$; $0 \leq d < 0.4$; $0 \leq e \leq 0.2$; and $0 \leq f \leq 0.2$. In this embodiment, $A^0$ is preferably Cr, $A^1$ is preferably Ti, and $A^2$ is preferably Mg. In other words, the preferred formula is $LiMn_{1-b}Ni_cCr_dTi_eMg_fO_2$.

The lithium manganese oxide compounds of the invention can be prepared by mixing together stoichiometric amounts of source compounds containing lithium, manganese and $[A]$ to give the desired molar ratio for the formula $LiMn_{1-x}[A]_xO_2$ described above. The source compounds (raw materials) can be the pure elements but are typically compounds containing the elements such as oxides or salts thereof. For example, the source compounds are typically hydrated or anhydrous oxides, hydroxides, carbonates, nitrates, sulfates, chlorides or fluorides, but can be any other suitable source compound that will not cause elemental defects in the resulting lithium manganese oxide compound. In addition, the elements for the lithium manganese oxide compound can each be supplied from separate source compounds or at least two of the elements can be supplied from the same source compounds. In addition, the source compounds can be mixed in any desirable order.

The specific source compounds used in accordance with the invention depend on numerous factors including the cost, disperseability, reactivity and by-products of the source compounds. In particular, oxides, hydroxides and carbonates can be preferred in some instances because they do not require additional equipment to remove by-products but can be less reactive than nitrates, sulfates, chlorides and fluorides that produce by-products that must be removed. The lithium manganese oxide compounds of the present invention can be prepared, for example, using $Li_2CO_3$, LiOH and $MnO_2$ to provide the lithium and manganese, and various source compounds (e.g. $TiO_2$, $Mg(OH)_2$, NiO, $Ni(OH)_3$, $Cr(NO_3)_3$ and $Cr(OH)_3$) to provide the dopants.

Although the lithium manganese oxide compounds are preferably prepared by solid state reactions, it can be advantageous to react the raw materials using wet chemistry such as sol-gel type reactions, alone or in combination with solid state reactions. For example, the source compounds comprising the manganese and dopants $[A]$ can be prepared as a solution in a solvent such as water and the manganese and dopants $[A]$ precipitated out of solution as an intimately mixed compound such as a hydroxide. The mixed compound can then be blended with a lithium source compound. The reaction mixture can also be prepared by suspending source compounds in a solution of other source compounds and spray drying the resulting slurry to obtain an intimate mixture. Typically, the selection of reaction methods will vary depending on the raw materials used and the desired end product.

The mixture once prepared can be reacted to form the doped lithium manganese oxide of the invention. Preferably, the mixture is reacted by firing the mixture at greater than 700° C., and preferably between 800° C. and 1000° C., for sufficient time to produce the compound in a single phase. The mixture is generally fired for a total of between about 4 and about 48 hours in one or more firing steps with at least one of the firing steps occurring at a temperature of greater than 700° C. The mixture can be fired in an oxygen-containing atmosphere where additional oxygen is needed to form the compound. Preferably, the mixture is fired in an inert (e.g. argon) atmosphere. Any suitable apparatus can be used to fire the compound including, e.g., a rotary calciner, a stationary furnace and a tunnel furnace. The resulting compound is then cooled to room temperature using a slow cooling rate (e.g. less than about 5° C./min) or a rapid cooling rate (e.g. greater than about 8° C./min). Preferably, the resulting compound is cooled at a rate of between about 8° C./min and about 140° C./min.

In addition to the method of producing the $LiMn_{1-x}[A]_xO_2$ compounds of the invention discussed above, the compounds of the invention can be prepared by ion exchange. In particular, a compound can be prepared in the manner described above using alkali metals such as sodium or potassium instead of lithium, and the resulting compound ($NaMn_{1-x}[A]_xO_2$ or $KMn_{1-x}[A]_xO_2$) can be ion-exchanged with lithium in a $Li^+$ ion-containing solution to obtain $LiMn_{1-x}[A]_xO_2$.

The compounds of the invention can be used as an active cathode material in an electrochemical cell for a lithium or lithium-ion battery. Typically, these compounds are combined with a carbonaceous material and a binder polymer to form the cathode for the electrochemical cell. The negative electrode of the lithium or lithium-ion battery can be lithium metal or alloys, or any material capable of reversibly lithiating and delithiating at an electrochemical potential relative to lithium metal between about 0.0 V and 0.7 V. Examples of negative electrode materials include carbonaceous materials containing H, B, Si and Sn; tin oxides; tin-silicon oxides; and composite tin alloys. The negative electrode is separated from the positive electrode material in the cell using an electronic insulating separator. The electrochemical cell further includes an electrolyte. The electrolyte can be non-aqueous liquid, gel or solid and preferably comprises a lithium salt, e.g., $LiPF_6$.

Electrochemical cells using the lithium manganese oxide compounds of the invention as the positive electrode material can be combined for use in portable electronics such as cellular phones, camcorders, and laptop computers, and in large power applications such as for electric vehicles and hybrid electric vehicles.

The present invention further includes dilithiated forms of the compounds described above. In particular, The lithium manganese oxide compounds of the invention allow lithium ions to readily diffuse during both the charge and discharge cycles of the battery. In the discharge cycle for these lithium manganese oxides wherein z Li per formula unit are electrochemically removed per formula unit, the lithium manganese oxide takes the formula $Li_{1-z}Mn_{1-x}[A]_xO_2$, wherein $0 \leq z \leq 1$.

It is understood that upon reading the above description of the present invention and reviewing the accompanying drawings, one skilled in the art could make changes and variations therefrom. These changes and variations are included in the spirit and scope of the following appended claims.

That which is claimed:

1. A compound having the formula:

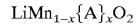

$LiMn_{1-x}\{A\}_xO_2$ wherein $0<x<0.5$, $\{A\}$ is a combination of two or more dopants, and the average oxidation state N of the dopant combination $\{A\}$ is $+2.8 \leq N \leq +3.2$.

2. The compound according to claim 1, wherein $0<x \leq 0.4$.

3. The compound according to claim 1, wherein at least one of the dopants A is Ti or Zr.

4. The compound according to claim 1, wherein a=x; $\{A\}_x$ is $A^1_{a/2}A^2_{a/2}$; $A^1$ is Ti, Zr, or a combination thereof; and $A^2$ is Mg, Ca, Sr, Zn, Ba, or a combination thereof.

5. The compound according to claim 4, wherein $A^1$ is Ti.

6. The compound according to claim 4, wherein $A^2$ is Mg.

7. The compound according to claim 4, wherein $0<a \leq 0.4$.

8. The compound according to claim 1, wherein N is about +3.0.

9. A compound having the formula $LiMn_{1-b}Ni_cA^0_dA^1_eA^2_fO_2$, wherein $A^0$ is Cr, Co, or a combination thereof; $A^1$ is Ti, Zr, or a combination thereof; $A^2$ is Mg, Ca, Sr, Zn, Ba, or a combination thereof; $b=c+d+e+f$; $0.1 \leq b < 0.5$; $0.1 \leq c \leq 0.3$; $0 \leq d \leq 0.4$; $0 \leq e \leq 0.2$; $0 \leq f \leq 0.2$; and the average oxidation state N of the dopant combination $\{Ni, A^0, A^1, A^2\}$ is $+2.8 \leq N \leq +3.2$.

10. The compound according to claim 9, wherein $0.1 \leq b \leq 0.4$ and $0 \leq d < 0.4$.

11. The compound according to claim 9, wherein $A^0$ is Cr, $A^1$ is Ti, and $A^2$ is Mg.

12. The compound according to claim 9, wherein N is about +3.0.

13. A lithium or lithium-ion secondary battery including a positive electrode comprising a compound having the formula $LiMn_{1-x}\{A\}_xO_2$ wherein $0<x<0.5$, $\{A\}$ is a combination of two or more dopants, and the average oxidation state N of the dopant combination $\{A\}$ is $+2.8 \leq N \leq +3.2$.

14. A method of preparing a compound having the formula $LiMn_{1-x}\{A\}_xO_2$ wherein $0<x<0.5$, $\{A\}$ is a combination of two or more dopants, and the average oxidation state N of the dopant combination $\{A\}$ is $+2.8 \leq N \leq +3.2$, said method comprising the steps of:

mixing together source compounds containing lithium, manganese and $\{A\}$ in amounts corresponding to the formula $LiMn_{1-x}\{A\}_xO_2$ wherein $0<x<0.5$, $\{A\}$ is a combination of two or more dopants, and the average oxidation state N of the dopant combination $\{A\}$ is $+2.8 \leq N \leq +3.2$;

firing the mixture of source compounds at greater than 700° C. to produce the $LiMn_{1-x}\{A\}_xO_2$ compound.

15. The method according to claim 14, wherein said firing step comprises firing the mixture at between 800° C. and 1000° C.

16. The method according to claim 14, wherein said mixing step comprises mixing together source compounds such that $0<x \leq 0.4$.

17. The method according to claim 14, wherein said mixing step comprises mixing together source compounds wherein at least one of the source compounds includes Ti or Zr.

18. The method according to claim 14, wherein said mixing step comprises mixing together source compounds such that a=x; $\{A\}_x$ is $A^1_{a/2}A^2_{a/2}$; $A^1$ is Ti, Zr, or a combination thereof; and $A^2$ is Mg, Ca, Sr, Zn, Ba, or a combination thereof.

19. The method according to claim 18, wherein said mixing step comprises mixing together source compounds such that $A^1$ is Ti and $A^2$ is Mg.

20. The method according to claim 14, wherein said mixing step comprises mixing together source compounds such that $LiMn_{1-x}\{A\}_xO_2$ is $LiMn_{1-b}Ni_cA^0_dA^1_eA^2_fO_2$, wherein $A^0$ is Cr, Co, or a combination thereof; $A^1$ is Ti, Zr, or a combination thereof; $A^2$ is Mg, Ca, Sr, Zn, Ba, or a combination thereof; b=c+d+e+f; $0.1 \leq b < 0.5$; $0.1 \leq c \leq 0.3$; $0 \leq d \leq 0.4$; $0 \leq e \leq 0.2$; $0 \leq f \leq 0.2$.

21. The method according to claim 20, wherein said mixing step comprises mixing together source compounds such that $A^0$ is Cr, $A^1$ is Ti, and $A^2$ is Mg.

* * * * *